United States Patent
Lim et al.

(10) Patent No.: US 10,377,595 B2
(45) Date of Patent: Aug. 13, 2019

(54) MEDIA FLAG

(71) Applicant: Hewlett-Packard Development Company, L.P., Houston, TX (US)

(72) Inventors: Sean Bs Lim, Singapore (SG); Shyh Chije Leong, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 329 days.

(21) Appl. No.: 15/513,987

(22) PCT Filed: Sep. 23, 2014

(86) PCT No.: PCT/US2014/056893
§ 371 (c)(1),
(2) Date: Mar. 23, 2017

(87) PCT Pub. No.: WO2016/048275
PCT Pub. Date: Mar. 31, 2016

(65) Prior Publication Data
US 2017/0305696 A1 Oct. 26, 2017

(51) Int. Cl.
| | | |
|---|---|---|
| *B65H 43/04* | (2006.01) | |
| *B65H 7/02* | (2006.01) | |
| *B65H 43/08* | (2006.01) | |
| *B65H 43/02* | (2006.01) | |
| *B65H 7/04* | (2006.01) | |
| *B65H 7/14* | (2006.01) | |

(Continued)

(52) U.S. Cl.
CPC .............. *B65H 7/02* (2013.01); *B65H 7/04* (2013.01); *B65H 7/14* (2013.01); *B65H 43/00* (2013.01); *B65H 43/02* (2013.01); *B65H 43/08* (2013.01); *G01D 5/342* (2013.01); *B65H 2402/543* (2013.01); *B65H 2402/545* (2013.01); *B65H 2403/51* (2013.01); *B65H 2553/41* (2013.01); *B65H 2553/612* (2013.01); *B65H 2801/06* (2013.01); *B65H 2801/39* (2013.01)

(58) Field of Classification Search
CPC .......... B65H 43/08; B65H 43/00; B65H 7/04; B65H 7/14; B65H 7/02; B65H 31/00; B65H 3/32; B65H 3/65; B65H 7/00; B65H 2553/00; B65H 1/00; B65H 2405/00; B65H 31/04; G01D 5/342; B41J 11/005; B41J 13/0009
USPC ..... 271/215, 121, 145, 265.01, 207; 347/14, 347/16, 105
See application file for complete search history.

(56) References Cited

U.S. PATENT DOCUMENTS

| | | | |
|---|---|---|---|
| 4,986,520 A | * | 1/1991 | Shido ................ B42B 4/00 270/58.14 |
| 7,308,227 B2 | | 12/2007 | Ahn |
| 7,549,622 B2 | | 6/2009 | Butikofer |

(Continued)

FOREIGN PATENT DOCUMENTS

| | | |
|---|---|---|
| CN | 1035187 A1 | 8/1989 |
| CN | 1577141 A | 2/2005 |
| JP | 2004196480 | 7/2004 |

*Primary Examiner* — Georgia Y Epps
*Assistant Examiner* — Kevin Wyatt
(74) *Attorney, Agent, or Firm* — HP Inc. Patent Department

(57) ABSTRACT

In one example, a media flag is disclosed. The media flag can rotate between a first position and a second position. The media flag translates parallel with the axis of rotation as the media flag rotates from the first position to the second position.

15 Claims, 3 Drawing Sheets

(51) Int. Cl.
*B65H 43/00* (2006.01)
*G01D 5/34* (2006.01)

(56) References Cited

U.S. PATENT DOCUMENTS

| | | |
|---|---|---|
| 8,387,972 B1 | 3/2013 | Ledgerwood et al. |
| 8,746,682 B2 | 6/2014 | Suleiman |
| 8,752,829 B1 * | 6/2014 | Uehling ............... B41J 11/0095 271/258.01 |
| 2004/0135311 A1 | 7/2004 | Chambers et al. |
| 2005/0189709 A1 * | 9/2005 | Bokelman ................ B65H 7/14 271/265.01 |
| 2006/0071400 A1 | 4/2006 | Johnson et al. |
| 2006/0087070 A1 | 4/2006 | Cook et al. |
| 2006/0221111 A1 * | 10/2006 | Ouchi .................... B41J 11/003 347/16 |
| 2007/0029725 A1 | 2/2007 | Marx et al. |
| 2007/0189825 A1 | 8/2007 | Silverbrook |
| 2010/0025924 A1 * | 2/2010 | Rennick ................ B65H 31/02 271/207 |

* cited by examiner

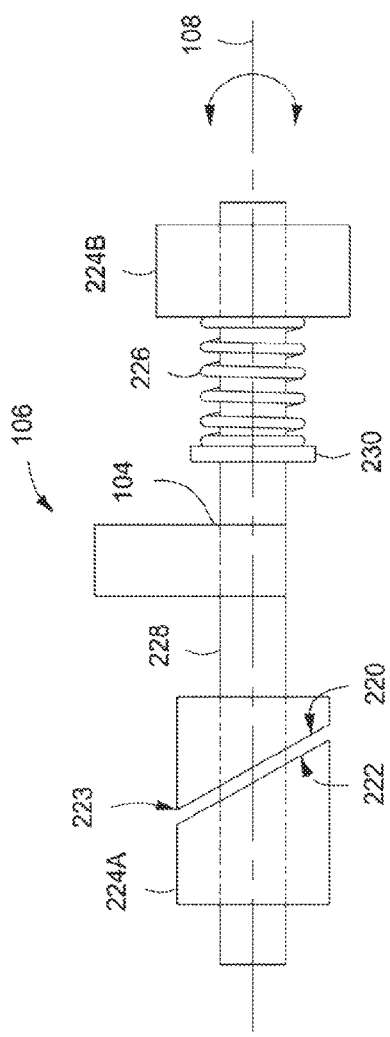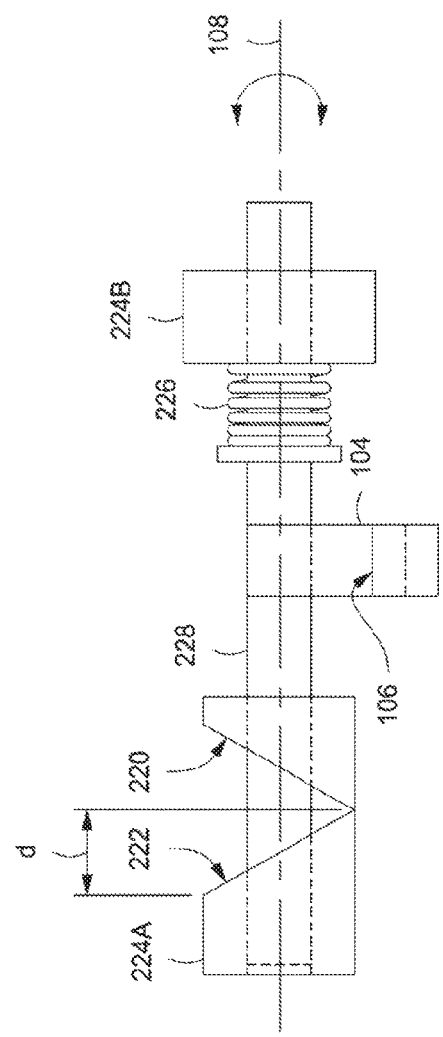

MEDIA FLAG

BACKGROUND

Printers create images on media by moving the media past a print engine. The media moves through a media path.

BRIEF DESCRIPTION OF THE DRAWINGS

FIG. 1A is a front view of an example media flag.

FIG. 1B is the example media flag from FIG. 1 rotated into a second position.

DETAILED DESCRIPTION

Figure 2:
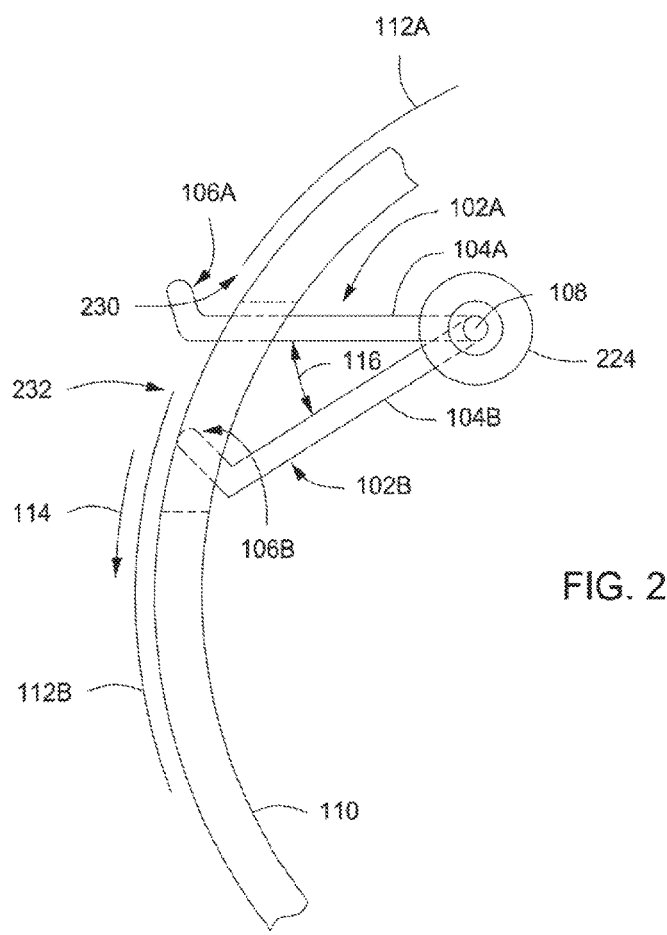
FIG. 2 is a side view of the example media flag of FIG. 1.

A printer may track where the media is in the media path using a media flag. A media flag typically has a part that blocks part of the media path. As leading edge of the media contacts the blocking part of the media flag, the media flag begins to rotate. As the media continues through the media path the media flag rotates out of the media path. A sensor detects the media flag rotation, for example an optical sensor. Therefore the location of the leading edge of the media can be determined. Scanners and automatic document feeders (ADF) also track the position of media in their media paths. Some scanners and ADFs use media flags to determine the location of the media in their media paths.

As explained above, imaging devices move media through a media path. Imaging devices include printers, scanners, copiers, multi-functional printer (MFP) and the like. A media path is any structure in the device that guides media from one location in the device to another location in the device. For example a device may have an input tray and an output tray; the media path would guide media from the input tray, through the device and into the output tray. Media paths may comprise pick rollers, pinch rollers, guiding members, output rollers and the like. The media path may move the media past a print engine, a scan engine, a dryer or the like.

Some devices have multiple media paths, for example a printer may have a simplex media path and a duplex media path. When printing on only one side of the media the media may follow the simplex media path. When printing on both sides of the media the media may follow the duplex media path.

The device may track where the media is in the media path using a media flag. A media flag typically has an arm that can rotate, around an axis of rotation, between a first position and a second position. The tip of the arm typically blocks part of the media path when the arm is in the first position. As a leading edge of the media contacts the tip of the arm, the media flag begins to rotate. As the media continues through the media path the media causes the tip of the arm to rotate out of the media path. A sensor detects the media flag rotation, for example an optical sensor. The media flag typically has a spring force acting against the arm perpendicular to the axis of rotation. This causes the media flag to snap back into the media path once the trailing edge of the media has passed by the media flag.

The media flag typically requires a large stroke or rotation for the media to clear the flag. Unfortunately the large stroke or rotation of the media flag causes a large deflection of the spring. The large spring deflection results in a high spring force. The high spring force may create a dent on the leading edge of the media. In addition the large spring force may cause the arm of the media flag to bounce as it snaps back into the first position. This may trigger the sensor and give a false reading. If the spring force is too low the media flag may not be fast enough to snap back into the first position before the next piece of media reaches the media flag. This creates a narrow design window for the spring force for the media flag.

In one example, a media flag may have the spring force acting parallel with the axis of rotation. A tapered surface on the media flag will act against a mating tapered surface on the media flag mount to move the media flag parallel to the axis of rotation as the media flag rotates. The translation of the media flag parallel to the axis of rotation will act against the spring force and create a force that will snap the media flag back into the first position after the trailing edge of the media has passed the media flag.

FIG. 1A is a front view of an example media flag. The media flag comprises an arm 104, an arm tip 106, a spring 226, a body 228 and a tapered surface 220 (see FIG. 2 for a better view of 104 and 106). The body 228 is shaped as a cylinder and fits inside holes in two media flag mounts (224A and 224B). The media flag can rotate about axis of rotation 108 between a first position and a second position. The media flag is shown in the first position in FIG. 1A and in the second position in FIG. 1B. The arm 104 is attached to the body 228 and extends perpendicularly from the body 228.

The tapered surface 220 is located near one end of the body 228 and mates with a mating tapered surface on media flag mount 224A. In this example the tapered surface only has one lobe 223. A lobe is defined as the high spot on the tapered surface, along the axis of rotation, with respect to the mating tapered surface. The spring 226 is mounted between the opposite media flag mount 224B and a shoulder 230 on the body 228. The spring acts to force the two tapered surface together.

As the media flag is rotated about axis 108 from the first position towards the second position, the tapered surface 220 is rotated against the mating tapered surface 222 on the media flag mount 224A, thereby forcing the media flag parallel with axis 108 towards media flag mount 224B. The lateral displacement of the media flag along axis 108 compresses the spring 226. FIG. 1B is the example media flag from FIG. 1 rotated into position 2. The tapered surface 220 is rotated compared to the mating tapered surface 222 on the media flag mount 224A and the media flag has been moved along axis of rotation 108 by distance d. Therefore the spring 226 has also been compressed by distance d. In some examples distance d is between 0.1 and 2.0 mm, for example 0.5 mm. Distance d can be changed by changing the angle the two tapered surfaces make with respect to the axis of rotation 108.

FIG. 2 is a side view of the example media flag of FIG. 1. The media flag comprises an arm 104 and an arm tip 106. The media flag can rotate about an axis of rotation 108 between a first position and a second position as shown by arrow 116. In some examples the angle of rotation between the first position and the second position is between 15 degrees and 180 degrees, for example 45 degrees. Media flag 102A is shown in the first position and media flag 102B is shown in the second position.

The media flag is mounted in media flag mount 224 near a media path. The media path is partially defined by media guide 110. When the media flag is in position 1 (as shown by media flag 102A) the arm tip 106A is in the media path. When the media flag is in position 2 (as shown by media flag 102B) the arm tip 106B is not in the media path.

A piece of media 112A is shown in the media path. The media travels along the media path in the direction shown by arrow 114. The leading edge 230 of the piece of media 112A is shown just before it reaches the arm tip 106A of media flag 102A. As the piece of media 112A continues along the media path, the media 112A will push against the arm tip 106A and rotate the media flag 102A towards the second position (as shown by arrow 116). Another piece of media 112B is shown further along the media path. This piece of media 112B has rotated the media flag into the second position where the arm tip 106 is no longer in the media path. Once the trailing edge 232 of the piece of media 112B passes by the arm tip 106B, the media flag 102B will snap back into position 1 due to the force created by the two tapered surfaces (220 and 222) and spring 226.

Figure 3:
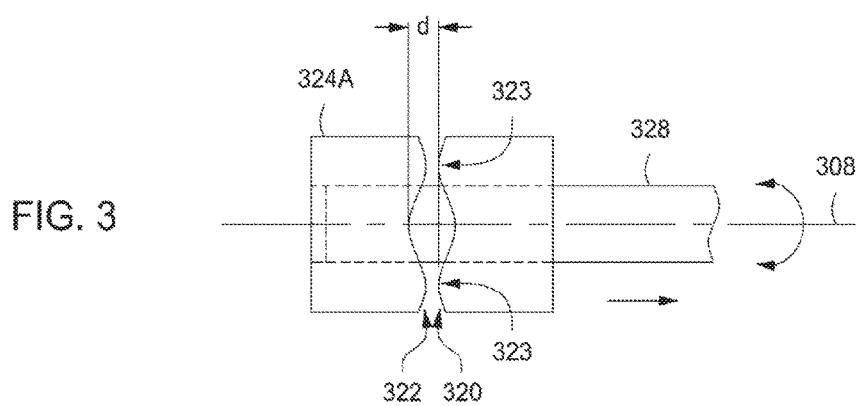
FIG. 3 is a partial view of an example media flag having a tapered surface with multiple lobes.

The tapered surface 220 shown in FIGS. 1 and 2 has only one lobe. In other examples the tapered surface may have multiple lobes. A lobe is defined as the high spot on the tapered surface, along the axis of rotation, with respect to the mating tapered surface. FIG. 3 is a partial view of an example media flag having a tapered surface with multiple lobes 323. The media flag comprises a body 328 and a tapered surface 320 attached to the body 328. The body is cylindrical in shape and is inserted into a circular hole formed in media flag mount 324A. The media flag can rotate between a first position and a second position about axis 308. The tapered surface 320 is adjacent to a mating tapered surface 322 formed on media flag mount 324A. The media flag is shown in position 2 where the media flag has been translated along axis 308 by distance d.

In this example the tapered surface 320 is in the form of a sinusoidal wave that has multiple lobes. Other types of waveforms may be used to create the lobes on the tapered surfaces. In other examples the tapered surface may not have smooth transitions between the lobes but may use triangular ramps.

In some examples the media flag and media flag mounts may be fabricated from plastic, for example acrylonitrile butadiene styrene (ABS). In other examples the media flag and media flag mounts may be fabricated from metal, for example aluminum. In some examples the surface finish of the two tapered surfaces may be fabricated to a high polish or coated with a friction reducing coating, for example Teflon. In the examples above the spring is shown as a compression spring. In other examples the spring may be a tension spring that acts to pull the two tapered surfaces together.

An imaging device is any device that converts a digital image into a physical image or converts a physical image into a digital image. Imaging devices include printers, scanners, copiers, multi-functional printers (MFP) and the like. MFPs may also be known as all-in-one (AiO) devices, multi-functional devices (MFD) and the like. Imaging devices may include an automatic document feeder (ADF).

Figure 4:
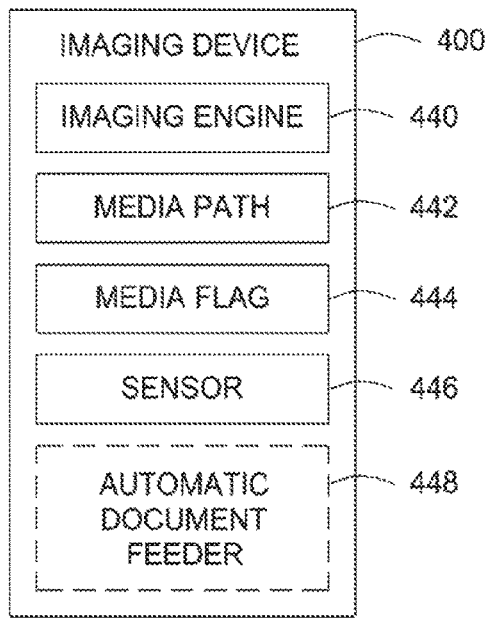
FIG. 4 is a block diagram of an example imaging device.

FIG. 4 is a block diagram of an example imaging device 400. Imaging device 400 comprises an imaging engine 440, a media path 442, a media flag 444 and a sensor 446. Imaging device 400 may also include an automatic document feeder (ADF) 448. Imaging engine 440 may be a print engine that marks images onto media, a scan engine that creates a digital image of images on media or the like. The media path 442 is any structure in the device that guides media from one location in the device to another location in the device. Media paths may comprise pick rollers, pinch rollers, guiding members, output rollers and the like. The media flag 444 has a spring acting parallel to the media flag's axis of rotation, for example the media flag shown in FIG. 1.

The media flag is positioned near the media path such that the arm tip is positioned in the media path when the media flag is rotated in the first position. The sensor 446 is positioned adjacent the media flag and is used to detects the rotation of the media flag. The sensor 446 may be any type of sensor, for example an optical sensor, a contact sensor or the like. In some examples media path may move media past the imaging engine. In other examples the media path may move media between an input tray and an output tray in an ADF. In some examples there may be multiple media paths. In these examples there may be multiple media flags for the different media paths.

Figure 5:
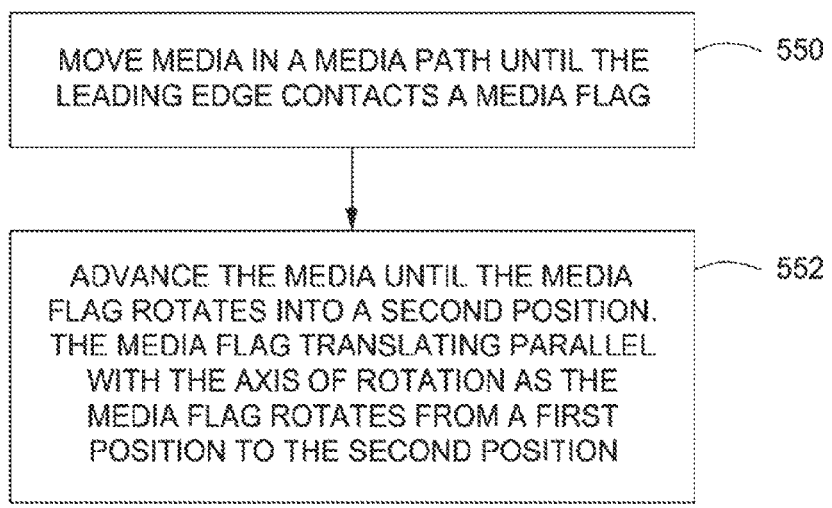
FIG. 5 is an example flow chart for a method of moving media past a media flag.

FIG. 5 is an example flow chart for a method of moving media past a media flag. At block 550 media is moved in a media path until a leading edge of the media contacts a media flag. The media flag is rotatable about an axis of rotation between a first position and a second position. The media flag is initially in the first position. At block 552 the media is advanced in the media path until the media flag rotates into the second position. As the media flag rotates the media flag translates parallel to the axis of rotation, thereby compressing a spring acting parallel to the axis of rotation. The spring urges a tapered surface on the media flag against a matching tapered surface on a media flag mount.

What is claimed is:

1. A media flag, comprising:
   an arm that can rotate about an axis of rotation between a first position and a second position, the arm having a tip;
   the tip located in a media path when the arm is in the first position and not located in the media path when the arm is in the second position;
   a tapered surface coupled to the arm, the tapered surface adjacent to a matching tapered surface on a media flag mount;
   a spring coupled to the arm and urging the arm parallel to the axis of rotation towards the tapered surface on the arm such that the arm translates parallel to the axis of rotation when the arm rotates between the first position and the second position.

2. The media flag of claim 1, further comprising:
   a sensor to detect when the arm is at the first position.

3. The media flag of claim 1, wherein the tapered surface has only one lobe.

4. The media flag of claim 1, wherein the media flag translates parallel to the axis of rotation by distance d, where distance d is between 0.1 mm and 2.0 mm.

5. The media flag of claim 1, wherein the media path is inside at least one of the following devices: an automatic document feeder (ADF), a printer, a scanner, and a multi-functional printer (MFP).

6. The media flag of claim 1, wherein the tapered surface is fabricated with a high polish surface finish.

7. A method of moving media past a media flag, comprising:
   moving media in a media path until a leading edge of the media contacts a media flag in the media path, the media flag rotatable about an axis of rotation between a first position and a second position, the media flag in the first position;

advancing the media in the media path until the media flag rotates into the second position, the media flag translating parallel to the axis of rotation as the media flag rotates from the first position to the second position thereby compressing a spring acting parallel with the axis of rotation, wherein the spring urges a tapered surface on the media flag against a matching tapered surface on a media flag mount.

8. The method of claim 7, wherein the media flag rotates through an angle between 15 degrees and 180 degrees when rotating between the first position and the second position.

9. The method of claim 7, wherein the media path is inside at least one of the following devices: an automatic document feeder (ADF), a printer, a scanner, and a multi-functional printer (MFP).

10. An imaging device, comprising:
a media path;
a media flag comprising:
   an arm that can rotate about an axis of rotation between a first position and a second position, the arm having a tip;
   the tip located in a media path when the arm is in the first position and not located in the media path when the arm is in the second position;
   a tapered surface coupled to the arm, the tapered surface adjacent to a matching tapered surface on a media flag mount;
   a spring coupled to the arm and urging the arm parallel to the axis of rotation towards the tapered surface on the arm such that the media flag translates parallel to the axis of rotation when the arm rotates between the first position and the second position; and
a sensor to detect when the arm is at the first position.

11. The imaging device of claim 10, further comprising:
an automatic document feeder (ADF) wherein the media path is in the ADF between an input tray and an output tray.

12. The imaging device of claim 10, further comprising:
at least one of either a print engine or a scan engine.

13. The imaging device of claim 10, wherein the tapered surface has multiple lobes.

14. The imaging device of claim 10, wherein the media flag translates parallel to the axis of rotation by distance d, where distance d is 0.5 mm or less.

15. The imaging device of claim 10, wherein there are multiple media flags.

* * * * *